United States Patent [19]

Velderman et al.

[11] Patent Number: 4,579,206
[45] Date of Patent: Apr. 1, 1986

[54] FLUID COUPLING DEVICE AND VALVE MECHANISM FOR USE THEREIN

[75] Inventors: David Velderman, Jackson; Paul A. Haist, Bellevue, both of Mich.

[73] Assignee: Eaton Corporation, Cleveland, Ohio

[21] Appl. No.: 508,784

[22] Filed: Jun. 29, 1983

[51] Int. Cl.[4] ............................................. F16D 31/00
[52] U.S. Cl. .................................. 192/58 B; 91/419; 192/82 T
[58] Field of Search ............... 192/58 B, 82 T; 91/419

[56] References Cited

U.S. PATENT DOCUMENTS

| | | | |
|---|---|---|---|
| 2,771,792 | 11/1954 | Whitney | 74/155 |
| 2,811,956 | 11/1955 | Lauck | 123/41.2 |
| 3,055,473 | 9/1962 | Oldberg | 192/58 B |
| 3,126,031 | 3/1964 | Hayner | 91/419 |
| 3,465,861 | 9/1969 | Seifert | 192/82 T |
| 3,664,129 | 5/1972 | Schwab | 91/419 |
| 3,880,265 | 4/1975 | Elmer | 192/58 B |
| 4,179,888 | 12/1979 | Goscenski, Jr. | 91/419 |
| 4,467,901 | 8/1984 | Hattori et al. | 192/82 T |
| 4,467,903 | 8/1984 | Hayashi et al. | 192/58 B |

Primary Examiner—Ronald C. Capossela
Attorney, Agent, or Firm—C. H. Grace; L. J. Kasper

[57] ABSTRACT

A fluid coupling device (15) is disclosed of the type including an output coupling assembly (67) and an input coupling member (81) with a shear space (90) disposed therebetween. The coupling device includes a valve assembly (117) to control the flow of fluid from a reservoir chamber (99) into the shear space (90). Movement of the valve assembly (117) is in response to variations in air pressure in a pressure chamber (59), tending to bias a piston (57) and shaft (93) in opposition to the force of a spring (113). Axial movement of the shaft (93) is translated into movement of a valve arm (127) in a plane parallel to the plane of a fluid port (119) by means of a valve actuation mechanism (109). In the subject embodiment, axial movement of a valve actuation piston (111) results in rotation of the valve assembly (117) about the axis of rotation of the device (15) for improved valve action in a remote sensing type of fluid coupling device.

9 Claims, 7 Drawing Figures

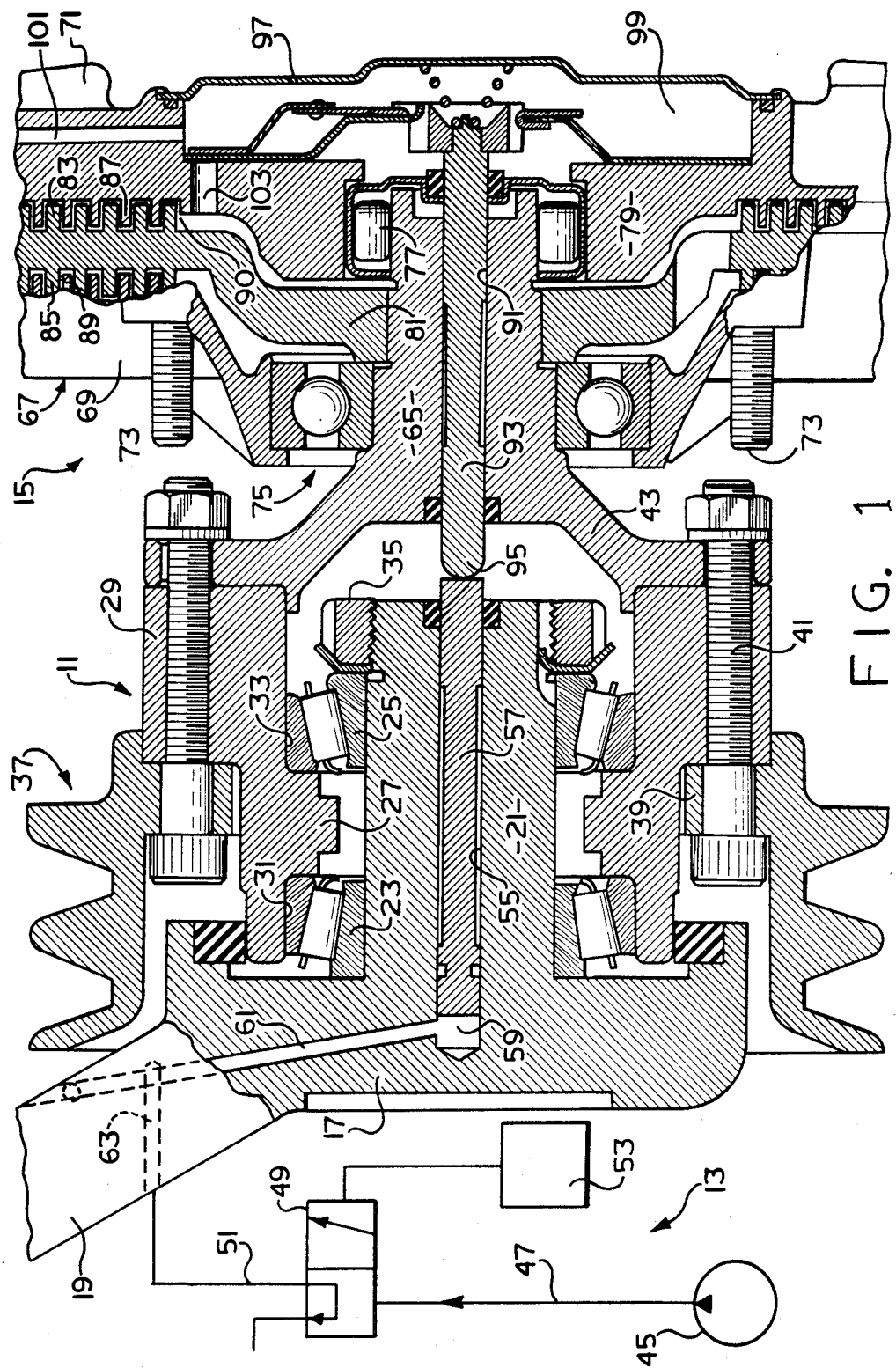

FLUID COUPLING DEVICE AND VALVE MECHANISM FOR USE THEREIN

BACKGROUND OF THE DISCLOSURE

The present invention relates to fluid coupling devices of the type including means operable to control the quantity of fluid in the fluid operating chamber. More particularly, the present invention relates to fluid coupling devices of the type including a valve element which is actuated in response to variations in a condition sensed by a remote condition sensing device.

U.S. Pat. No. 3,055,473, assigned to the assignee of the present invention, is a typical fluid coupling device of the type well known in the prior art. The fluid coupling device includes a first rotatable coupling member defining an axis of rotation, and cover means associated with the first member to define a fluid chamber therebetween. A valve means is disposed to separate the fluid chamber into a fluid operating chamber and a fluid reservoir chamber. A second rotatable member is disposed in the fluid operating chamber and is rotatable relative to the first coupling member. The valve means is operable to control the flow of fluid between the reservoir chamber and the operating chamber and includes a valve plate defining a fluid port lying in a plane generally perpendicular to the axis of rotation. The valve means also includes a valve member disposed to move in a plane parallel to the plane of the fluid port to vary the flow area of the fluid port and the amount of fluid in the operating chamber.

Remotely actuated fluid coupling devices are especially adapted to the use of valve elements which move in an axial direction, because, in a remotely actuated coupling, movement of the valve is usually achieved by means of a device such as a solenoid or fluid pressure piston arrangement which inherently has an axial output movement.

There have been several major problems associated with axially-movable valve elements. One of the problems which has been observed in regard to axially-movable valve elements is the lack of an accurate, predictable correlation between the amount of valve lift (axial movement) and flow through the fill port. As is understood by those skilled in the art, when a flat valve arm is lifted from a port plate, the effective port area is not merely equal to the area of the port, nor is the effective port area equal to the product of the circumference of the port and the amount of lift. Instead, it has been found that because of such factors as the flow characteristics of the fluid, fluid viscosity, speed of the coupling, etc., actual valve lift must be substantially greater than the theoretical valve lift in order for the effective port area to be equal to the actual area of the port. This situation makes it even more difficult than usual to achieve a desired relationship between the external condition being sensed, such as ambient air temperature or coolant temperature, and the output speed (fan speed) of the coupling.

SUMMARY OF THE INVENTION

Accordingly, it is an object of the present invention to provide an improved fluid coupling device utilizing an axially-movable input to the valve means in which the valve element itself does not move axially, thereby overcoming at least some of the problems normally associated with axially-movable valve elements.

The above and other objects of the present invention are accomplished by the provision of an improved fluid coupling device charactertized by the inclusion of a first means adapted to receive an input signal which varies with variations in the condition being sensed by a remote condition sensing device. The device further includes second means operable to transmit the input signal into motion of the valve member in the plane parallel to the plane of the fluid port.

BRIEF DESCRIPTION OF THE DRAWINGS

FIG. 1 is an overall view, partly in axial cross section, and partly in schematic, of a fan drive system of the type utilizing the present invention.

DESCRIPTION OF THE PREFERRED EMBODIMENT

Figure 3:
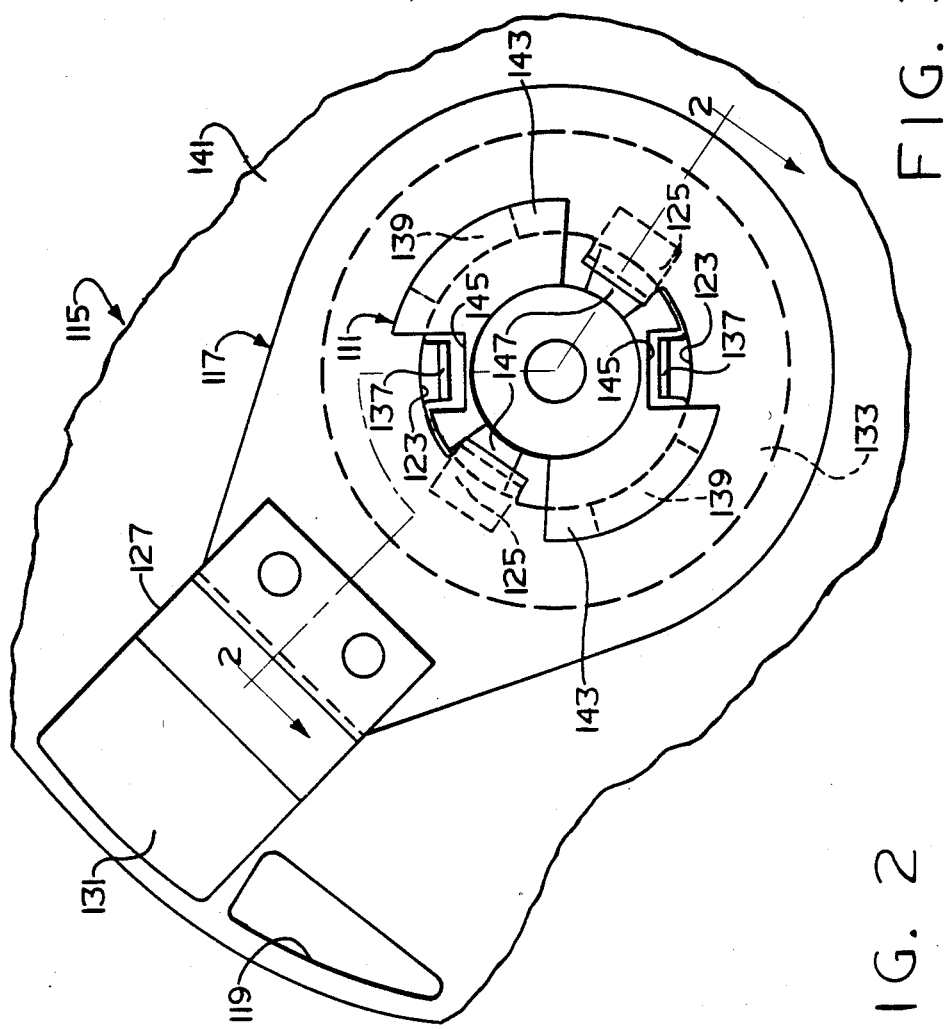
FIG. 3 is a fragmentary, transverse cross section taken on line 3—3 of FIG. 2, and on the same scale as FIG. 2.

Referring now to the drawings, which are not intended to limit the present invention, FIG. 1 illustrates the overall fan drive system which comprises a bracket assembly, generally designated 11, a remote condition sensing and control arrangement, generally designated 13, and a fluid coupling device generally designated 15.

The bracket assembly 11 includes a stationary bracket member 17 having a mounting portion 19 which is adapted to be attached to either the vehicle chassis or engine. The bracket member 17 includes a generally cylindrical hub portion 21, and seated on the hub portion 21 is a pair of tapered roller bearing sets 23 and 25. The bearing sets 23 and 25 are kept spaced apart by an annular inward projection 27 formed as part of an annular mounting member 29. The mounting member 29 defines a pair of internal cylindrical surfaces 31 and 33 which act as the seats for the outer races of the bearing sets 23 and 25, respectively. The bearing sets 23 and 25 are retained axially on the hub portion 21 by means of a large hex nut 35 which is in threaded engagement with the right end of the hub portion 21.

Attached to the mounting member 29 is a pulley member, generally designated 37, including an inwardly-extending flange 39. A plurality of bolts 41 pass through openings in the flange 39 and threaded bores defined by the mounting member 29, as well as through a plurality of openings defined by a flange portion 43 which is associated with the fluid coupling device, and will be described in greater detail subsequently. Therefore, the pulley member 37, mounting member 29, and flange portion 43 are held together in a fixed relationship by the bolts 41, and rotate at the same speed. Typically, the pulley 37 is driven by a V-belt (not shown) which, in turn, is driven by an engine-driven main pulley as is well known to those skilled in the art.

The remote condition sensing and control arrangement 13 includes a source of air pressure 45 which may typically be an engine driven air compressor, or a compressor in combination with some sort of pressure storage device such as an accumulator. The pressure output of the source 45 is communicated by a line 47 to an air pressure control valve 49. The air pressure in line 47 may be communicated through a line 51 to the bracket assembly 11 by the control valve 49, or the line 51 may be vented to atmosphere by the valve 49. The control valve 49 operates under the influence of a temperature condition sensing device 53. When the ambient air temperature (or radiator coolant temperature) sensed by the device 53 is at a predetermined, relatively low temperature, the control valve 49 is moved to a position in which the air pressure in the line 51 is vented to the atmosphere, but when the ambient air temperature increases to a predetermined relatively higher temperature level, the device 53 moves the control valve 49 to a position in which the air pressure is communicated from the line 47 to the line 51. The sensing and control arrangement 13 is shown only schematically herein, because its specific construction is not an essential feature of the present invention, as will become apparent subsequently. Also, such arrangements are generally well known in the prior art.

Referring again to the bracket assembly 11, the stationary bracket member 17 defines an axial bore 55, within which is disposed an axially-movable piston member 57. The axial bore 55 and the left end of the piston member 57 cooperate to define an air pressure chamber 59 which is in open fluid communication with the air pressure line 51 by means of a pair of air passages 61 and 63. Therefore, when the control valve 49 communicates air pressure to the line 51, such pressure in turn is communicated through passages 63 and 61 to the chamber 59, thus biasing the piston 57 to the right in FIG. 1.

Referring still to FIG. 1, the fluid coupling device generally designated 15 includes an input shaft 65 which preferably is formed integrally with the flange portion 43, such that input shaft 65 is driven at the same speed as the pulley 37. The fluid coupling 15 includes an output coupling assembly, generally designated 67 which includes a cast housing member 69 and a cast cover member 71, the members 69 and 71 being secured together by a plurality of bolts (not shown in FIG. 1). The radiator cooling fan (not shown) may be bolted to the housing member 69 by means of a plurality of threaded members 73 which are attached to the housing member 69. The housing member 69 serves as a support for the outer race of a bearing set 75, while the input shaft 65 serves as the support for the inner race of the bearing set 75. A roller bearing set 77 is disposed between the forward end (right end in FIG. 1) of the input shaft 65 and a central opening defined by an inwardly-extending portion 79 of the cover member 71. It will be appreciated subsequently that the portion 79 also functions as part of the valve means to control the flow of fluid within the coupling device 15.

The coupling device 15 includes an input coupling member 81 which is press-fit onto a portion of the input shaft 65 intermediate the bearing sets 75 and 77. Thus, the input coupling member 81 rotates at the same speed as the pulley 37 and input shaft 65, while the output coupling assembly 67 is rotatable relative to the input member 81. As is generally well known in the art, the forward surface of the input coupling member 81 defines a plurality of annular lands 83, while the rearward surface thereof defines a plurality of annular lands 85. The adjacent surface of the cover member 71 defines a plurality of annular lands 87 which are interdigitated with the lands 83, while the adjacent surface of the housing member 69 defines a plurality of annular lands 89 which are interdigitated with the lands 85. The forward lands 83 and 87 cooperate to define a portion of a shear space 90, while the rearward lands 85 and 89 cooperate to define another portion of the shear space 90, such that when the shear space is filled with viscous fluid, rotation of the input coupling member 81 results in rotation of the output coupling assembly 67 at a speed slightly less than that of the member 81.

The input shaft 65 defines an axial bore 91 within which is disposed an axially-movable shaft 93 including, at its left end in FIG. 1, a rounded portion 95. Additional structural details of the shaft 93, as well as its function, will be described subsequently.

Associated with the cover member 71 is a stamped cover 97 which is attached to the cover member 71 by suitable means, and cooperates therewith to define a fluid reservoir chamber 99. The cover member 71 defines a radially-extending passage 101 which communicates fluid being discharged from the shear space 90 back into the fluid reservoir 99 as is well known in the art. The inwardly-extending portion 79 of the cover member 71 defines an axially-extending passage 103, the function of which is to communicate fluid from the reservoir chamber 99 into the shear space 90 at a location radially inwardly from the interdigitated lands 83-89.

Figure 2:
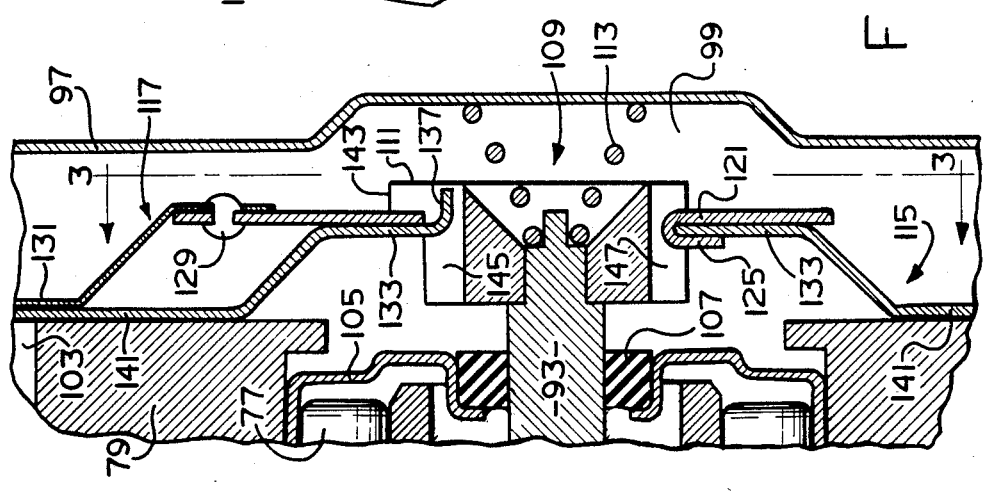
FIG. 2 is a fragmentary, axial cross section similar to FIG. 1, but on a larger scale, and taken on line 2—2 of FIG. 3.

Referring now to FIG. 2, it may be seen that the roller bearing set 77 includes a stamped metal cage member 105 which terminates in a radially-inward portion which surrounds a seal member 107, the seal 107 surrounding and supporting the forward end of the shaft 93.

VALVE ACTUATION MECHANISM

At the extreme right end of the shaft 93 is a valve actuation mechanism, generally designated 109. The mechanism 109 includes a generally cylindrical valve actuation piston 111 which is seated on a reduced diameter portion of the shaft 93. Seated against a further-reduced diameter portion of the shaft 93 is a conical compression spring 113 which is seated, at its forward end, against the cover 97. The purpose of the spring 113 is to bias the shaft 93 toward the left in FIGS. 1 and 2.

The valve actuation mechanism 109 also includes a valve plate 115 which is seated against the forward surface of the inwardly-extending portion 79. The actuation mechanism 109 further includes a valve assembly, generally designated 117.

Referring now to FIG. 3, in conjunction with FIG. 2, it may be seen that the valve plate 115 defines a fluid port 119 which is in fluid communication with the axially-extending passage 103. Therefore, with the fluid port 119 uncovered as shown in FIG. 3, centrifugal force acting on the fluid in the reservoir chamber 99 will cause the fluid to flow through the fluid port 119 and the passage 103 into the shear space 90, thus increasing the amount of torque transmission which occurs between the input coupling member 81 and the output coupling assembly 67. The subject embodiment of the present invention may be referred to as a "fail-safe" fluid coupling because, in the absence of air pressure in the chamber 59, the compression spring 113 biases the shaft 93 to the left in FIGS. 1 and 2 which results in the valve assembly 117 being rotated to the position shown in FIG. 3, in which fluid flows into the shear space 90. Therefore, the device is referred to as "fail-safe" because any loss of air pressure will result in the fluid coupling device 15 operating in the "engaged" mode to drive the engine cooling fan at a relatively high speed and prevent overheating of the engine. In the subject embodiment, it is necessary to apply air pressure to the chamber 59 in order to bias the piston 57 and shaft 93 to the right in FIGS. 1 and 2 to move the valve assembly 117 counterclockwise in FIG. 3, covering the fluid port 119 and causing the coupling device 15 to operate in the "disengaged" mode in which the radiator cooling fan is driven at a relatively low speed.

Figures 4, 5, 6, 7:
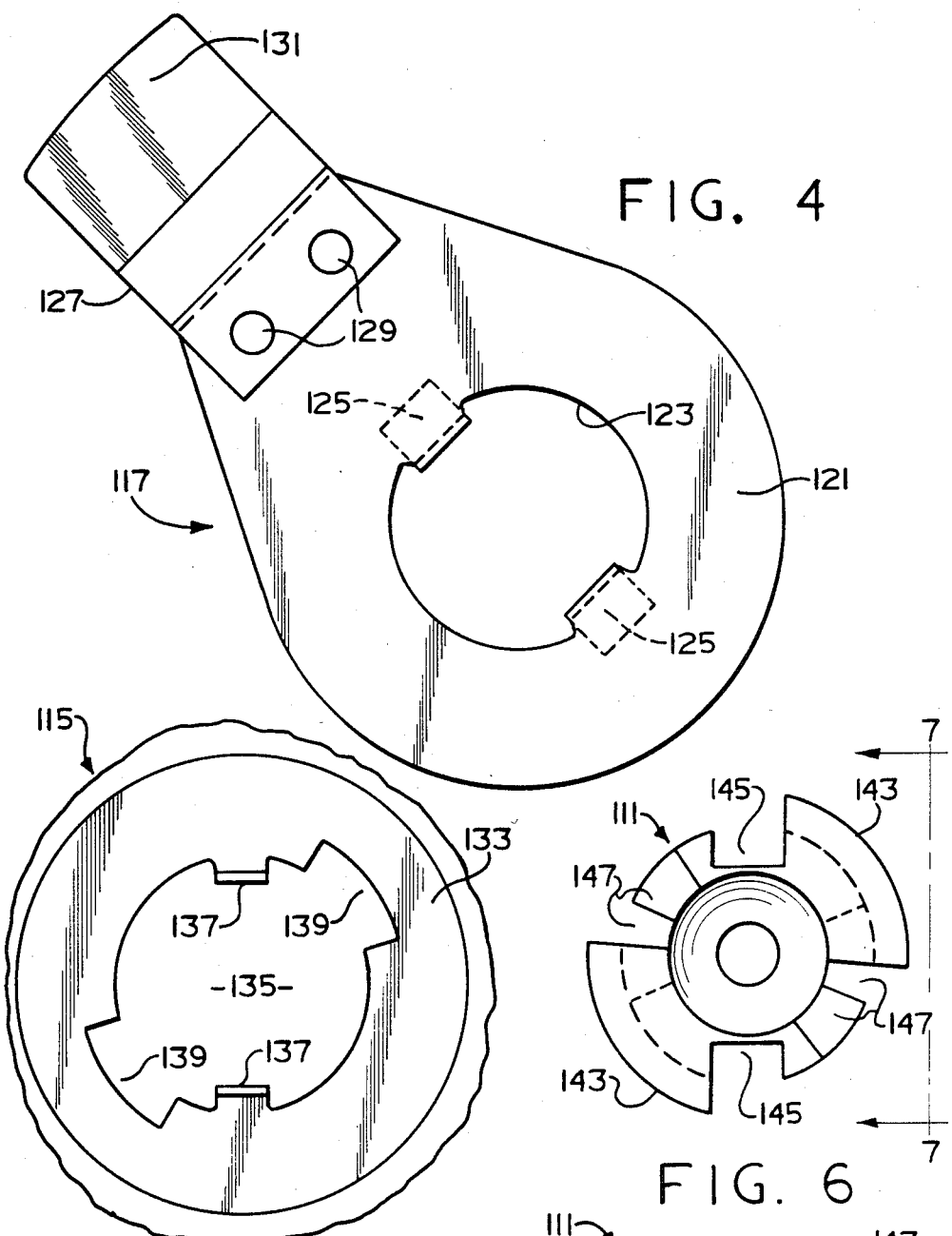
FIG. 4 is a plan view, similar to FIG. 3, of the valve member of the present invention.
FIG. 5 is a plan view, similar to FIG. 3, of a portion of the valve plate of the present invention.
FIG. 6 is a plan view, similar to FIG. 3, of the valve actuation piston of the present invention.
FIG. 7 is a side elevation view of the valve actuation piston shown in FIG. 6 and taken on line 7—7 or FIG. 6.

Referring now to FIGS. 4-7 (in conjunction with FIGS. 2 and 3), the individual parts of the actuation mechanism 109 will be described in detail. Referring first primarily to FIG. 4, the valve assembly 117 includes a central support plate 121 defining a central opening 123. The support plate 121 includes a pair of tab portions 125 which are bent or folded under the plane of the support plate 121 (see also FIG. 2). The valve assembly 117 further includes a valve arm 127 which performs the actual valving function with respect to the fluid port 119. The valve arm 127 is attached to the support plate 121 by means of a pair of rivets 129. As may best be seen in FIG. 2, a portion of the valve arm 127 lies in the plane of the support plate 121, while another portion 131 of the valve arm 127 lies in a plane adjacent the fluid port 119.

Referring now primarily to FIG. 5, the valve plate 115 includes a raised central portion 133 which defines a central opening 135. The central portion 133 defines a pair of upwardly-turned tabs 137 and a pair of arcuate cutout portions 139. The valve plate 115 further includes an outer peripheral portion 141 (see FIGS. 2 and 3) which lies in a plane adjacent the surface of the portion 79 of the cover member 71. It is the peripheral portion 141 which defines the fluid port 119.

Referring now primarily to FIGS. 6 and 7, the valve actuation piston 111 is generally cylindrical as mentioned previously, and includes a pair of oppositely disposed, radially-extending lip portions 143 (see also FIGS. 2 and 3). The piston 111 also defines a pair of oppositely disposed, axially-extending square channels 145 and a pair of oppositely disposed, generally helical grooves 147.

Referring now primarily to FIGS. 2 and 3, the assembly and relationship of the various parts of the mechanism 109 will be described briefly. It should first be understood that the valve plate 115 is attached to the cover portion 79 of the member 71, such as by welding, staking, or the use of several machine screws, in order to prevent radial or axial movement of the valve plate 115. With the valve plate 115 fixed in the position shown in FIGS. 2 and 3, the next step is to insert the valve assembly 117, which must first be turned to a position approximately 90° counterclockwise from the position shown in FIG. 3, such that the tab portions 125 are received by the cutout portions 139 of the valve plate 115. At the same time, the upwardly-turned tabs 137 will be received within the central opening 123 of the support plate 121, and extend therethrough, if the underside of the support plate 121 is in engagement with the top surface of the central portion 133 as shown in FIG. 2. By rotating the valve assembly 117 clockwise to the position shown in FIG. 3, the radially inner periphery of the central portion 133 will be trapped between the support plate 121 and the tab portions 125 of the valve assembly 117, as shown in FIG. 2. Thus, with the valve assembly 117 in the position shown in FIG. 3, the tab portions 125 prevent axial movement of the valve assembly 117, while permitting radial movement thereof.

Finally, the valve actuation piston 111 is inserted by orienting the piston 111, circumferentially, to the position shown in FIG. 3 in which the square channels 145 receive the upwardly-turned tabs 137. It is the function of the engagement between the tabs 137 and channels 145 to permit the piston 111 to move axially, while preventing rotation of the piston 111. As the piston 111 is inserted (moved to the left in FIG. 2), it is necessary to again rotate the valve assembly 117 counterclockwise in FIG. 3 to a position in which the radially-innermost extent of the tab portions 125 are in alignment with and in engagement with the bottom portion (left end in FIG. 2) of the helical grooves 147. Then, as the piston 111 is moved to the position shown in FIG. 2, the configuration of the grooves 147 will cause the tabs 125 and valve assembly 117 to move clockwise to the position shown in FIG. 3 which, as described previously, is the unactuated position corresponding to the engaged mode of operation of the fluid coupling device 15.

After the assembly of the actuation mechanism 109 as described above, it is still necessary to insert the compression spring 113 as shown in FIG. 2, then install the cover 97 and secure it to the cover member 71.

OPERATION

Because the subject embodiment of the present invention is designed to operate on a fail-safe basis, the absence of air pressure in the chamber 59 will result in the valve actuation mechanism 109 being in the position shown in FIGS. 2 and 3, which is the engaged mode of the coupling as described above. When it is desired to operate the coupling 15 in the disengaged mode, such as when the sensing device 53 senses a relatively cool air or water temperature, the valve 49 is moved to a position in which there is air pressure in the line 51, as well as passages 63 and 61 and the chamber 59. When this occurs, the biasing force of the air pressure biases the shaft 93 and piston member 57 to the right in FIGS. 1 and 2, which also moves the valve actuation piston 111 to the right in FIG. 2. As the piston 111 moves to the right in FIG. 2, the engagement of the tab portions 125 within the helical grooves 147 results in rotation of the valve assembly 117 in the counterclockwise direction from the position shown in FIG. 3 to a position in which the portion 131 covers the fluid port 119, blocking the flow of fluid from the reservoir chamber 99 into the shear space 90. When this occurs, the fluid coupling device 15 operates in the disengaged mode.

In reviewing the construction and operation of the present invention, it may be seen that a number of structural and functional advantages are achieved. The only point at which contact occurs between parts rotating at different speeds (other than bearings, seals, etc.) is at the point of engagement between the right end of the piston member 57 and the rounded portion 95 of the shaft 93, the piston 57 being generally nonrotatable within the stationary bracket member 17, and the shaft 93 rotating at the speed of the output coupling assembly 67.

It is a special feature of the present invention that because of the use of air pressure in the chamber 59 to move the piston 57 and shaft 93 axially, it is possible to achieve relatively larger rotational displacement of the valve arm than was possible in the prior art devices. Typically, with the valve 49 actuated, the air pressure in the chamber 59 may be sufficient to generate a force on the shaft 93 which is in the range of 6-9 pounds. As a result, substantial axial travel of the shaft 93 is possible, and the valve actuation mechanism 109 of the invention is then able to achieve relatively large rotational displacement of the valve arm 127. Another advantage of the relatively large input forces and displacements is that any frictional drag or stiction within the mechanism represents a relatively small percentage of the total force and displacement and may be easily overcome without resultant error in the valve action.

It should be apparent to those skilled in the art that, with the use of the valve actuation mechanism 109 of the present invention, it is possible to vary the angle of the helical grooves 147 to achieve any desired relationship between the amount of axial movement of the shaft 93 and piston 111 and the rotational displacement of the valve assembly 117. Therefore, a fluid coupling device could have its output speed versus temperature relationship changed drastically for a particular vehicle application merely by changing the size or configuration of the fluid port 119, and substituting a valve actuation piston 111 having the helical grooves at a different angle.

Although the present invention has been illustrated and described by means of a preferred embodiment in which axial movement of the piston 57 and shaft 93 are translated into rotational movement of the valve assembly 117, it should be understood by those skilled in the art that the essence of the present invention is not rotation of the valve assembly, but instead, movement of the valve assembly in a plane generally perpendicular to the axis of the device. Stated another way, it is an important feature of the present invention that the valve actuation mechanism 109 translate the axial motion of the piston 57 and shaft 93 into movement of the valve assembly in a plane parallel to the plane containing the fluid port 119. By way of example, the movement of the valve assembly could also, within the scope of the invention, be along a radial line, or along some other predetermined path containing both radial and rotational components.

The invention has been described in detail sufficient to enable one skilled in the art to make and use the same. It is believed that upon a reading and understanding of the foregoing specification, various alterations and modifications will become apparent to those skilled in the art, and it is intended to include all such alterations and modifications as part of the invention, insofar as they come within the scope of the appended claims.

We claim:

1. In a fluid coupling device of the type including a first rotatable coupling member defining an axis of rotation, cover means associated with said first member to define a fluid chamber therebetween, valve means disposed to separate said fluid chamber into a fluid operating chamber and a fluid reservoir chamber, a second rotatable coupling member disposed in said fluid operating chamber and being rotatable relative to said first coupling member viscous fluid being disposed in said operating chamber and operable to transmit torque from said second coupling member to said first coupling member by means of viscous shear drag, said valve means being operable to control the flow of fluid between said reservoir chamber and said operating chamber and including a valve plate defining a fluid port lying in a plane generally perpendicular to said axis of rotation, and a valve member disposed to move in a plane parallel to said plane of said fluid port to vary the flow area of said fluid port and the amount of fluid in said operating chamber, characterized by said fluid coupling device including:
 (a) first means adapted to move axially in response to an input signal which varies with variations in the condition sensed by a remote condition sensing device; and
 (b) second means mechanically coupled to said first means and operable to transmit said axial movement of said first means into said motion of said valve member in said plane parallel to said plane of said fluid port.

2. A device as claimed in claim 1 characterized by said remote condition sensing device comprising means operable to vary said input signal in response to variations in a predetermined temperature condition.

3. A device as claimed in claim 2 characterized by said remote condition sensing device comprising means operable to generate a fluid pressure signal which varies with variations in said predetermined temperature condition.

4. A device as claimed in claim 3 characterized by said fluid coupling device including fluid pressure actuated means movable in a direction generally parallel to said axis of rotation in response to variations in said fluid pressure signal, said movement of said fluid pressure actuated means comprising said input signal.

5. A device as claimed in claim 4 characterized by said fluid coupling device including a stationary bracket assembly in fluid communication with with said fluid pressure signal, said fluid pressure actuated means being disposed in association with said stationary bracket assembly.

6. A device as claimed in claim 4 characterized by said first means comprising an elongated member operable to move axially in response to movement of said fluid pressure actuated means.

7. A device as claimed in claim 6 characterized by said second means comprising means operable to translate axial input movement of said elongated member into rotary output movement of said valve member.

8. A device as claimed in claim 7 characterized by a first member defining at least one helical groove and a second member defining at least one projection, adapted to engage said helical groove, one of said members being restrained from axial movement while being permitted to rotate, and the other of said members being restrained from rotational movement while being permitted to move axially.

9. In a fluid coupling device of the type including a first rotatable coupling member defining an axis of rotation, cover means associated with said first member to define a fluid chamber therebetween, valve means disposed to separate said fluid chamber into a fluid operating chamber and a fluid reservoir chamber, a second rotatable coupling member disposed in said fluid operating chamber and being rotatable relative to said first coupling member, viscous fluid being disposed in said operating chamber and operable to transmit torque from said second coupling member to said first coupling member by means of viscous shear drag, said valve means being operable to control the flow of fluid between said reservoir chamber and said operating chamber and including a valve plate defining a fluid port and a valve member disposed to rotate about an axis of rotation to vary the flow area of said fluid port and the amount of fluid in said operating chamber, characterized by said fluid coupling device including:

(a) first means adapted to move axially in response to an input signal which varies with variations in the condition sensed by a remote condition sensing device; and (b) second means mechanically coupled to said first means and operable to transmit said axial movement of said first means into signal into said rotary motion of said valve member.

* * * * *